United States Patent Office 3,017,619
Patented Jan. 16, 1962

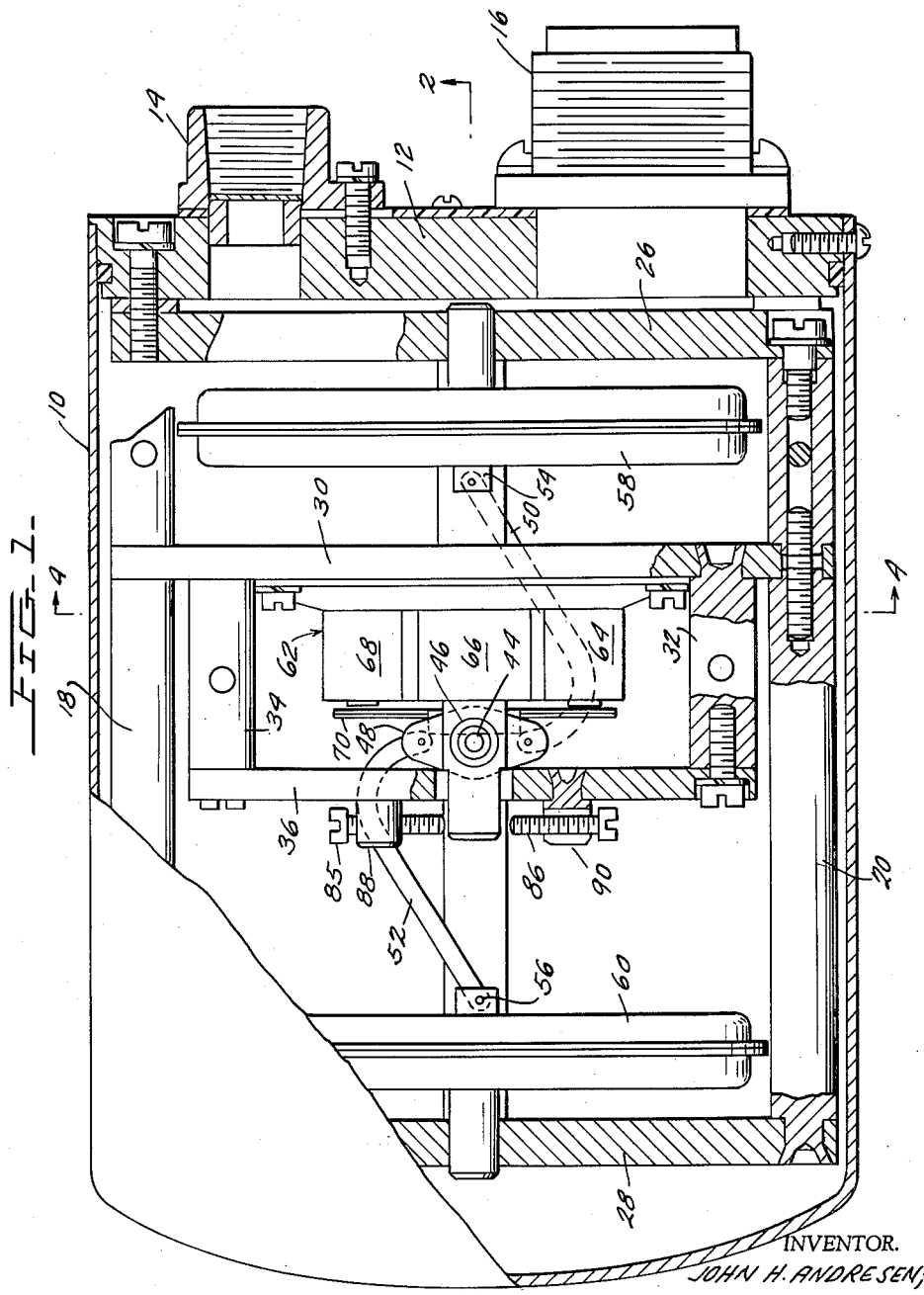

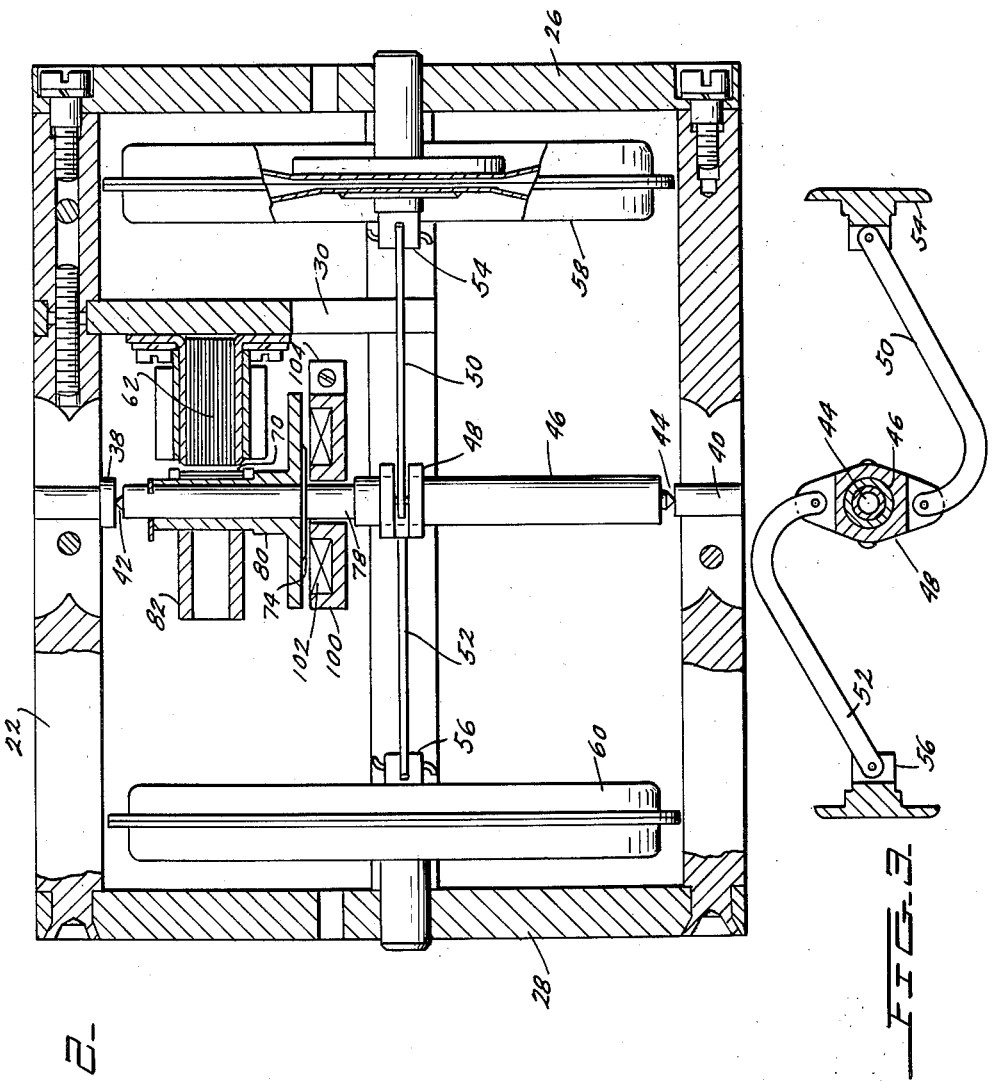

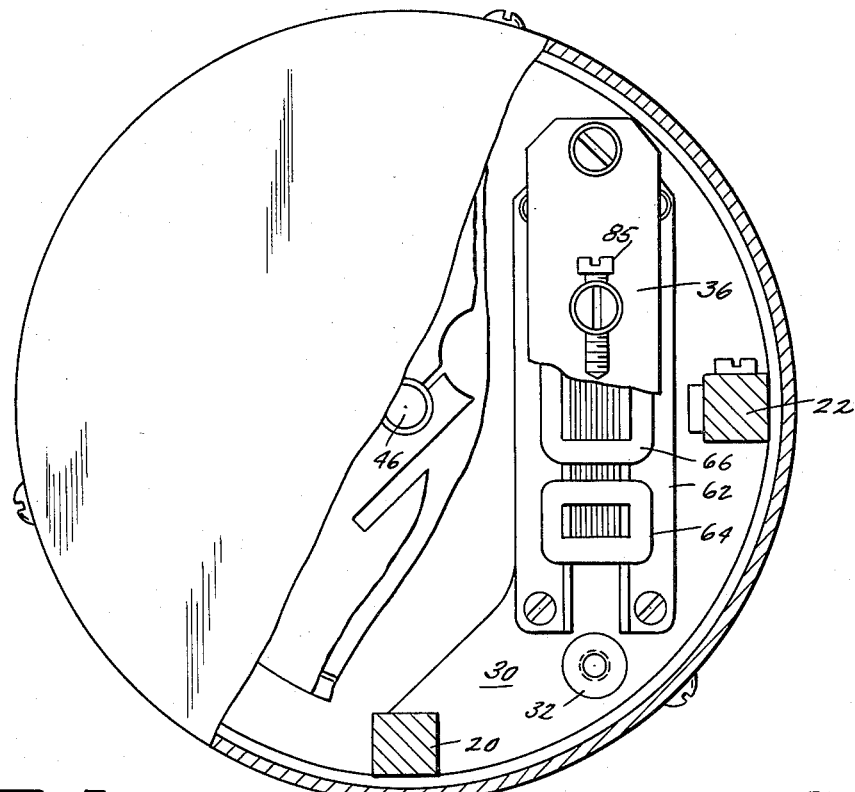
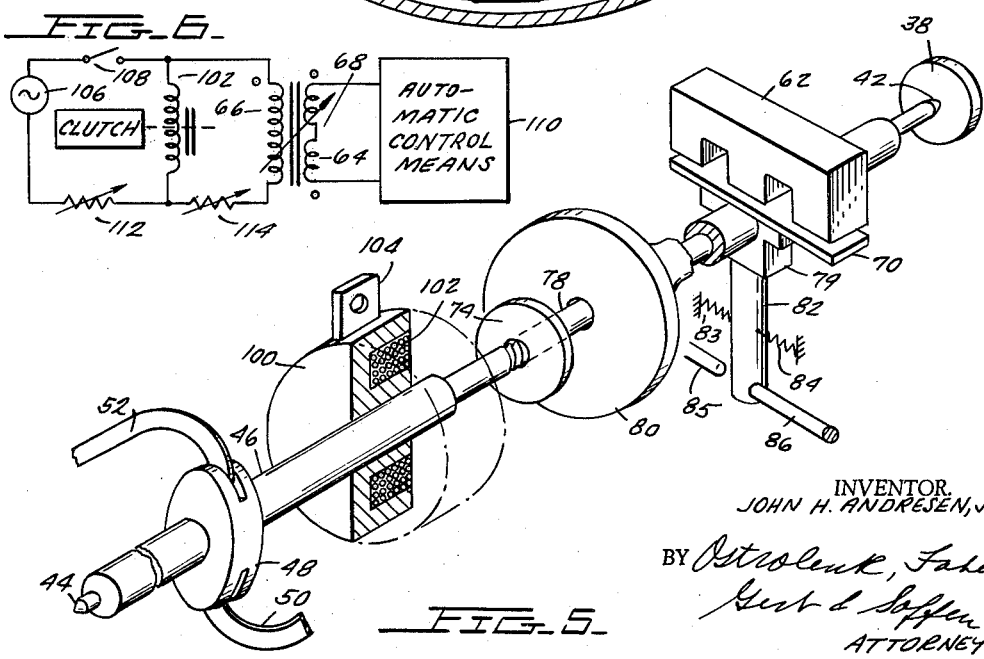

3,017,619
ALTITUDE CONTROLLER
John H. Andresen, Jr., Greenwood Lake, N.Y., assignor to Kollsman Instrument Corporation, Elmhurst, N.Y., a corporation of New York
Filed Apr. 20, 1959, Ser. No. 807,418
12 Claims. (Cl. 340—213)

This invention relates to a holding controller for aircraft in which a predetermined parameter is automatically held at a specified value.

Controllers of the type to which this invention is directed are well-known in the art, and are used for maintaining a predetermined altitude, airspeed or mach number. In the present application the controller will be illustrated for the case of an altitude controller.

Signals from these devices are generally superimposed on those of an automatic altitude control device such as the well-known autopilot which automatically controls the aircraft's control surfaces in response to input error signals. Thus, it is well-known to provide a diaphragm capsule operated mechanism which positions a shaft as a function of altitude. When the desired altitude is attained by the aircraft, a clutch is engaged to tie the mechanism to a centered electrical pick-off, such as an E type of pick-off or synchro, with the output of the pick-off connected into the pitch servo of the autopilot. If the airplane now goes above or below the altitude at which the automatic controller was connected, appropriate corrective signals are generated to alter the aircraft's pitch, and the aircraft returns to the pre-set altitude.

Other types of systems are well-known, such as a device in which an altitude sensitive mechanism is connected directly to one side of an electrical pick-off. Error signals from the pick-off are fed to a servo system which attempts to drive the other half of the pick-off to a null position. When the desired altitude is reached, the pick-off error signal from the servo amplifier is connected into the autopilot pitch control circuit, and the servo motor is stopped. Thus, the servo motor automatically maintains a reference position from which error signals may be measured when the desired altitude is reached.

Still another type of altitude controlling mechanism utilizes pneumatic means where one side of the pressure sensing diaphragm is directly connected to static pressure, while the other side is connected to a reference volume of air which is, in turn, connected through a valve to the static pressure. Once the desired altitude is reached, the valve which normally connects the static and reference volumes of air is closed so that a differential pressure of the proper sense will be developed when the aircraft goes above or below the predetermined altitude. This difference is sensed in the pick-up which generates corrective signals to the autopilot.

In each of the above noted types of systems, relatively complex mechanisms are required, such as serve mechanisms, complex pneumatic structure and complex clutches. Furthermore, once the preset altitude is set and drives the autopilot, it is difficult to over-ride the automatic pilot by manual control. This is because the mechanisms will "give" only prior to that point which would cause prohibitive mechanical stresses in their components.

Furthermore, where there are large altitude changes from the predetermined altitude, large corrective signals are generated which may cause violent changes of the aircraft control surfaces and cause a loss of control of the aircraft.

Controller devices have been proposed which utilize a clutch having a very small maximum torque which is connected between an error signal generating structure and the pressure measuring means which drives the controller. The clutch is formed by two engageable members which are biased into engagement by a permanent magnet. With this structure, the controller may always remain in the automatic pilot circuit with its reference valve being adjusted through clutch slippage.

I have found that I can replace the permanent magnet clutch of the above noted type with an electromagnetic type of clutch where the clutching members are capable of transmitting a relatively small maximum torque. The clutch in this case is energized only when the controller is to take control of the aircraft so that the error signal generator is normally biased to a zero error position. Thus, I change the mode of operation of the controller from that of the above noted type to that shown in U.S. Patent No. 2,689,951 to Argentieri et al., and assigned to the assignee of the instant invention. In this mode of operation, the signal generator is in the zero position, or minimum signal position when the signal generator is coupled to the pressure measuring means to drive the automatic pilot. However, the light friction clutch will cause the controller to thereafter operate in much the same manner as disclosed in the noted type device, so that the maximum generated error signal can be limited by simple stop means, and a violent altitude change will cause a new reference altitude to be set, rather than causing violent corrective changes to return the aircraft to its predetermined level.

Accordingly, a primary object of this invention is to provide a novel altitude controller which is simple in construction, highly reliable, has low weight and low cost.

Another object of this invention is to provide a novel and rugged altitude controller in which a low torque capacity clutch allows the prevention of violent error signals to an autopilot by simple mechanical stop means.

A further object of this invention is to provide a novel altitude controller which is connected to automatically control an aircraft when a predetermined altitude is reached and simplified error signal generating means having a mechanically limited output are permitted by the use of a low torque capacity clutch.

These and other objects of this invention will become apparent from the following description when taken in connection with the drawings, in which:

FIGURE 1 is a side cross-sectional view of the controller of this invention shown as an altimeter in conjunction with its housing.

FIGURE 2 is a cross-sectional view of FIGURE 1 taken across the lines 2—2 with the housing removed.

FIGURE 3 is a partial side cross-sectional view of the manner in which the pressure sensing elements drive the shaft of the device of FIGURES 1 and 2.

FIGURE 4 is a partial side cross-sectional view of FIGURE 1 taken across the lines 4—4.

FIGURE 5 is an exploded perspective view and shows the manner in which the shaft of the controller of FIGURES 1 and 2 carries a load torque capacity clutch and the I of an E-I pick-off element.

FIGURE 6 is a circuit diagram showing the manner in which the clutch and pick-off element are connected with respect to an auto-pilot controller.

Referring first to FIGURE 1, the controller is generally contained within a container 10 having a base portion 12 which contains outlets 14 and 16 for supplying pneumatic and electrical connections to the instrument.

The instrument is generally supported on four posts 18, 20, 22 and 24. The posts 18, 20, 22 and 24 are generally supported on platforms 26 and 28 which receive the posts in the screw type engagement, as best seen in FIGURE 2. The posts further act as supports for receiving intermediate platform 30, as seen in FIGURES 1, 2 and 4, where platform 30 has a general crescent shape with the two extremities and a central portion being received by a necked-down portion of shafts 18, 20 and 22 respectively.

Platform 30, as will be seen more fully hereinafter, operates to support the electrical pick-off structure and has support legs 32 and 34 projecting therefrom, as seen in FIGURES 1 and 4, which support a second platform 36 at their upper end, which carries the stop members to be described hereinafter.

Each of posts 22 and 24 carry pivotal shaft mounting members 38 and 40 which receive the protruding portions 42 and 44 respectively of shaft 46. Thus, shaft 46 is pivotally mounted in a substantially frictionless manner, as is well known in the art, through the use of a bearing type engagement between members 44 and 40 and members 42 and 38.

A central portion of shaft 46 has an extending crank arm 48, as seen in FIGURES 1 and 3, where crank arm 48 receives a first link 50 at one end and a second link 52 at its other end. Links 50 and 52 have their other ends connected to boss structures 54 and 56 respectively of diaphragms 58 and 60 respectively, as seen in FIGURES 1 and 2. Accordingly, when the diaphragms 58 and 60, which may be evacuated, are exposed to changes in pressure due to changes in altitude, they will expand or contract so as to cause rotation of crank arm 48, and thus a rotation of shaft 46 which is rigidly secured to crank arm 48.

As stated above, platform 30 carries the pick-off or transducer structure to be utilized in accordance with this invention. For illustrative purposes, the pick-off structure is shown herein to comprise the well known E-I type of structure.

However, the pick-off structure could be of any desired nature such as a potentiometer.

Thus, platform 30 carries the E portion 62 of the pick-off structure. This E portion is comprised of a laminated magnetic structure having a general E shape formed by three projecting legs with a common end yoke. Each leg of the E structure is provided with a winding seen as windings 64, 66 and 68 respectively in FIGURES 1 and 4. The I portion of the structure 70, best seen in FIGURES 1 and 2, is positioned to span each of the three legs of the E member.

Generally, in this kind of structure, the center coil 66 is provided with some fixed energization, as will be seen more fully hereinafter. If the I structure 70 is physically rotated so that it moves closer to the upper leg and further from the lower leg, it is clear that the magnetic flux balance in the structure will be upset so that a larger voltage will be induced in coil 64 than in coil 68, since the airgap in the magnetic circuit including coil 64 is smaller. When the I piece 70 is equidistant from each of the legs, the induced voltage in coils 64 and 68 will be substantially identical, so that appropriate circuitry will make this a null point. If the I piece 70 now rotates in the opposite direction so as to be closer to the leg carrying coil 68 than the leg carrying coil 64, then a higher voltage will be induced in coil 68 than in coil 64.

Using these general principles, it is clear that electrical circuitry may be easily provided wherein a clockwise rotation of I member 70 of FIGURE 1 may be converted into a positive electrical signal with respect to some null point in which the I piece is equidistant from each of the legs, while a counterclockwise rotation of I piece 70 may be converted into a negative signal with respect to the null position. A typical circuit will be described later with reference to FIGURE 6.

The manner in which I piece 70 or a potentiometer (if desired) is driven by shaft 46 is best understood from FIGURES 1, 2 and 5 which show the specific structure of the shaft.

Referring to these figures, it is seen that a portion of shaft 46 is positioned concentrically with respect to an electromagnetic structure comprised of magnetic housing 100 which has an annular-shaped opening in one face which receives an energizing coil 102. The magnetic housing 100 is stationarily positioned with respect to shaft 46 and is fastened in any desired manner by the protruding lug 104 to some relatively stationary portion of the controller housing.

From this construction, it will be apparent that shaft 46 may rotate independently of magnet housing 100. However, it will be understood by those skilled in the art that the magnet housing 100 could be directly fastened to shaft 46, and the coil 102 could be energized by either having sufficiently long flexible leads, or through a brush type of structure.

A frictional washer 74 is positioned in spaced relation with respect to energizing magnet 100, the washer 74 being of any desired material having some predetermined coefficient of friction. If desired, the washer 74 may be threadably secured on shaft 46, as indicated by threads 76 of FIGURE 5, so that the position of friction washer 74 is adjustable with respect to the surface of the face of the magnet 100.

The shaft 46 then continues in a necked-down portion 78 which extends through a magnetic sleeve 80 having an internal diameter slightly greater than the external diameter of shaft section 78, so that magnetic sleeve 80 is capable of rotational movement with respect to shaft portion 78. The upper end of sleeve 80 extending away from washer 74 has a portion thereof which is rigidly connected to fastening member 79, and fastening member 79 rigidly connects the I piece 70 and a protruding section 82 to the sleeve 80.

The protruding member 82, as will be seen more fully hereinafter, is utilized as a part of the stop mechanism which limits the motion of I piece 70. In order to normally center I piece 70 in a predetermined position, a pair of springs 83 and 84 seen only in FIGURE 5 are connected to protruding section 82 to hold it in a predetermined position.

It is to be noted that springs 83 and 84 could be connected to any part of the mechanism which is rigidly connected to I piece 70, and could, for example, be formed of spiral springs associated with sleeve 80.

The stop means or stop members are formed by screws 85 and 86, best seen in FIGURE 1, and schematically illustrated in FIGURE 5, where screws 85 and 86 are carried by threaded brackets 88 and 90 respectively which are carried from platform 36. Thus, the screws 85 and 86 are positioned to permit only a predetermined motion of extension 82 about its pivot which is the axis of shaft 46.

The electrical circuit for driving the controller is schematically illustrated in FIGURE 6, and comprises a voltage source 106 connected through a control switch 108 which is operable by the pilot of the aircraft; and a first circuit is connected in series with voltage source 106 and switch 108 which includes clutch coil 102, and a parallel connected circuit includes winding 66 of the center leg of E piece 62.

As schematically illustrated in FIGURE 6, windings 64 and 68 of the outer legs of the E piece 62 are inductively connected to center winding 66, and the energization of winding 64 or 68 is variable, as indicated by the arrow. Windings 64 and 68 are then connected in opposing relationship, as illustrated by the conventional dots indicating the start of the winding, and are connected to some automatic control means 110 which could be the autopilot control signal input of a conventional autopilot.

From the foregoing, it will be understood that when the switch 108 is closed both clutch coil 102 and E coil 66 are energized. The magnitude of current through these coils are controllably adjusted by rheostats 112 and 114 respectively, although these could be fixed impedances which are calibrated prior to the insulation of the unit.

In operation, when the desired altitude is reached, assuming the controller to be used is an altitude controller, the switch 108 is closed by the pilot so that coil 102 is energized, and a magnetic flux is created in housing 100 which extends toward sleeve 80 so as to draw sleeve 80 into engagement with friction washer 74 under some predetermined force. This provides a highly controlled low torque capacity clutch means for transmitting torque from shaft 46 to the sleeve 80.

Note that if the torque is to be increased, then rheostat 112 of FIGURE 6 may be controlled so that a larger current flows in coil 102, and, conversely, the torque may be decreased by decreasing the current in coil 102. In a similar manner, control may be achieved by varying the position of washer 74 with respect to the face of magnet 100.

It is to be further noted that the washer 74 may not be strictly necessary to follow the principle of this invention, and that it would be possible to have sleeve 80 bear directly on the face of magnet 100 with this face suitably coated with a friction material, if desired.

Assuming now that switch 108 is closed, and the desired altitude has been attained, and it is now desired to maintain that altitude, the combined output of coils 64 and 68 is taken, for example, to the pitch control circuit of the autopilot 110. When the aircraft is caused to rise the diaphragms 58 and 60 will expand to rotate shaft 46 in a clockwise direction with respect to FIGURE 1 so that the upper portion of I piece 70 comes closer to the leg of the E magnet carrying coil 64 than the leg carrying coil 68. This rotation, of course, is from the neutral position established by biasing springs 83 and 84 of FIGURE 5. As the aircraft continues to rise, shaft 46 rotates to a maximum position, as determined by stop 85 which receives extension 82 of sleeve 80. Thus, the I piece 70 can no longer rotate.

If the generated signal to the automatic control means 110 is, for some reason, insufficient to stabilize the aircraft, and it continues to rise, the continued expansion of diaphragms 58 and 60 will soon impart a sufficient torque to shaft 46 so that the frictional engagement between washer 74 and magnetic sleeve 80 is overcome whereby the shaft 46 begins to rotate independently of sleeve 80 with the clutch members slipping.

Accordingly, some positive voltage of a predetermined maximum magnitude is induced from the input coil 66 to coil 64, while a relatively lower voltage is induced in coil 68. The difference in these two voltages is some positive voltage which is the output error signal of the system. This error signal is a relatively small one, and may be easily over-ridden by the pilot from the manual aircraft controls.

Note that while the clutch slippage occurs a new level is constantly assumed by the altitude controller. That is to say, if the climb is stopped by the pilot at some height slightly greater than the height he wishes to maintain, the maximum signal generated by the E–I pick-off will cause the aircraft to begin to descend. This descent will be under the influence of the maximum signal until the torque capacity of the clutch formed by the magnet 100, washer 74 and sleeve 80 is attained, at which time slippage stops and actual rotation of shaft 46 begins. Thus, I piece 70 begins to move to its equilibrium position, whereupon it is positioned equidistant from each of the legs containing coils 64 and 68 respectively, and there is a zero output signal.

Furthermore, since only a predetermined maximum signal can be generated by the pick-off, a large change in altitude which cannot be handled by the autopilot will not cause excessively large return signals to the autopilot which could result in a loss of control of the aircraft.

It is to be particularly noted that the novel combination of the present invention of an energizable clutch means and a low torque capacity clutch for an altitude controller permits the use of an extremely simple pick-off means, since it is now possible to have a mechanical obstruction in the path of the motion of the pick-off means without being able to transmit excessive torque to the pick-off that could cause its breakage.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claims.

What is claimed is:

1. A controller; said controller comprising a pressure measuring mechanism for converting pressure change into an output mechanical motion, a transducer means for converting mechanical motion into an electrical signal and an electromagnetic clutch; said electromagnetic clutch having an input member and an output member; said input member and output member being continuously connected to one another through a magnetically responsive clutching medium and an energizable winding for generating a magnetic field through said clutch medium and a stop means for limiting the motion of said output member; said clutching medium being constructed to transmit only a relatively small torque of a predetermined controlled value and to thereafter slip; said input member of said clutch being operatively connected to said pressure measuring mechanism to have said output mechanical motion of said pressure measuring mechanism applied thereto; said output member of said clutch being operatively connected to said transducer means and supplying mechanical motion thereto to be converted to an electrical signal; said transducer generating an electrical signal responsive to pressure change measured by said pressure measuring mechanism; a pressure change beyond some predetermined value causing the application of a torque beyond said predetermined torque capacity of said clutch to be reached whereby said input shaft of said clutch continues to rotate independently of said output shaft and said transducer.

2. A controller; said controller comprising a pressure measuring mechanism for converting pressure change into an output mechanical motion, a transducer means for converting mechanical motion into an electrical signal and an electromagnetic clutch; said electromagnetic clutch having an input member and an output member; said input member and output member being continuously connected to one another through a magnetically responsive clutching medium and an energizable winding for generating a magnetic field through said clutching medium and a stop means for limiting the motion of said output member; said clutching medium being constructed to transmit only a relatively small torque of a predetermined controlled value and to thereafter slip; said input member of said clutch being operatively connected to said pressure measuring mechanism to have said output mechanical motion of said pressure measuring mechanism applied thereto; said output member of said clutch being operatively connected to said transducer means and supplying mechanical motion thereto to be converted to an electrical signal; said transducer generating an electrical signal responsive to pressure change measured by said pressure measuring mechanism; a pressure change beyond some predetermined value causing the application of a torque beyond said predetermined torque capacity of said clutch to be reached whereby said input shaft of said clutch continues to rotate independently of said output shaft and said transducer; the initial position of said first shaft setting a reference point from which output signals of said transducer are measured.

3. A controller; said controller comprising a pressure measuring mechanism for converting pressure change into an output mechanical motion, a transducer means for converting mechanical motion into an electrical signal and an electromagnetic clutch; said electromagnetic clutch having an input member and an output member; said input member and output member being continuously connected to one another through a magnetically responsive clutching medium and an energizable winding for generating a magnetic field through said clutching medium and a stop means for limiting the motion of said output member; said clutching medium being constructed to transmit only a relatively small torque of a predetermined controlled value and to thereafter slip; said input member of said clutch being operatively connected to said pressure measuring mechanism to have said output mechanical motion of said pressure measuring mechanism applied thereto; said output member of said clutch being operatively connected to said transducer means and supplying mechanical motion thereto to be converted to an electrical signal; said transducer generating an electrical signal responsive to pressure change measured by said pressure measuring mechanism; a pressure change beyond some predetermined value causing the application of a torque beyond said predetermined torque capacity of said clutch to be reached whereby said input shaft of said clutch continues to rotate independently of said output shaft and said transducer; the initial position of said first shaft setting a reference point from which output signals of said transducer are measured; said rotation of said first shaft independently of said output shaft adjusting said reference point to a new value.

4. A controller; said controller comprising a pressure measuring mechanism for converting pressure change into an output mechanical motion, a transducer means for converting mechanical motion into an electrical signal and an electromagnetic clutch; said electromagnetic clutch having an input member and an output member; said input member and output member being continuously connected to one another through a magnetically responsive clutching medium and an energizable winding for generating a magnetic field through said clutching medium and a stop means for limiting the motion of said output member; said clutching medium being constructed to transmit only a relatively small torque of a predetermined controlled value and to thereafter slip; said input member of said clutch being operatively connected to said pressure measuring mechanism to have said output mechanical motion of said pressure measuring mechanism applied thereto; said output member of said clutch being operatively connected to said transducer means and suplying mechanical motion thereto to be converted to an electrical signal; said transducer generating an electrical signal responsive to pressure change measured by said pressure measuring mechanism; a pressure change beyond some predetermined value causing the application of a torque beyond said predetermined torque capacity of said clutch to be reached whereby said input shaft of said clutch continues to rotate independently of said output shaft and said transducer; said transducer means comprising an E–I pick-off means, the I member of said E–I pick-off means being operatively connected to said output shaft and being movable with respect to the E member of said E–I pick-off means responsive to movement of said output shaft.

5. A controller; said controller comprising a pressure measuring mechanism for converting pressure change into an output mechanical motion, a transducer means for converting mechanical motion into an electrical signal and an electromagnetic clutch; said electromagnetic clutch having an input member and an output member; said input member and output member being continuously connected to one another through a magnetically responsive clutching medium and an energizable winding for generating a magnetic field through said clutching medium and a stop means for limiting the motion of said output member; said clutching medium being constructed to transmit only a relatively small torque of a predetermined controlled value and to thereafter slip; said input member of said clutch being operatively connected to said pressure measuring mechanism to have said output mechanical motion of said pressure measuring mechanism applied thereto; said output member of said clutch being operatively connected to said transducer means and supplying mechanical motion thereto to be converted to an electrical signal; said transducer generating an electrical signal responsive to pressure change measured by said pressure measuring mechanism; a pressure change beyond some predetermined value causing the application of a torque beyond said predetermined torque capacity of said clutch to be reached whereby said input shaft of said clutch continues to rotate independently of said output shaft and said transducer; said transducer means comprising an E–I pick-off means, the I member of said E–I pick-off means being operatively connected to said output shaft and being movable with respect to the E member of said E–I pick-off means responsive to movement of said output shaft; said stop means being positioned to limit the motion of said I member to some predetermined range.

6. A controller; said controller comprising a pressure measuring mechanism for converting pressure change into an output mechanical motion, a transducer means for converting mechanical motion into an electrical signal and an electromagnetic clutch; said electromagnetic clutch having an input member and an output member; said input member and output member being continuously connected to one another through a magnetically responsive clutching medium and an energizable winding for generating a magnetic field through said clutching medium and a stop means for limiting the motion of said output member; said clutching medium being constructed to transmit only a relatively small torque of a predetermined controlled value and to thereafter slip; said input member of said clutch being operatively connected to said pressure measuring mechanism to have said output mechanical motion of said pressure measuring mechanism applied thereto; said output member of said clutch being operatively connected to said transducer means and supplying mechanical motion thereto to be converted to an electrical signal; said transducer generating an electrical signal responsive to pressure change measured by said pressure measuring mechanism; a pressure change beyond some predetermined value causing the application of a torque beyond said predetermined torque capacity of said clutch to be reached whereby said input shaft of said clutch continues to rotate independently of said output shaft and said transducer; the initial position of said first shaft setting a reference point from which output signals of said transducer are measured; said rotation of said first shaft independently of said output shaft adjusting said reference point to a new value; said transducer means comprising an E–I pick-off means, the I member of said E–I pick-off means being operatively connected to said output shaft and being movable with respect to the E member of said E–I pick-off means responsive to movement of said output shaft; said stop means being positioned to limit the motion of said I member to some predetermined range.

7. A controller; said controller comprising a pressure measuring mechanism for converting pressure change into an output mechanical motion, a transducer means for converting mechanical motion into an electrical signal and an electromagnetic clutch; said electromagnetic clutch having an input member and an output member; said input member and output member being continuously connected to one another through a magnetically responsive clutching medium and an energizable winding for generating a magnetic field through said clutching medium and a stop means for limiting the motion of said output member; said clutching medium being constructed to transmit only a relatively small torque of a predetermined controlled value and to thereafter slip; said input member of said clutch being operatively connected to said pressure measuring mechanism to have said output mechanical motion of said pressure measuring mechanism applied thereto; said output member of said clutch being operatively connected to said transducer means and supplying mechanical motion thereto to be converted to an electrical signal; said transducer generating an electrical signal responsive to pressure change measured by said pressure measuring mechanism; a pressure change beyond some predetermined value causing the application of a torque beyond said predetermined torque capacity of said clutch to be reached whereby said input shaft of said clutch continues to rotate independently of said output shaft and said transducer; said clutch medium including an energizable electromagnet, a friction member carried by one of said input or output members and a magnetic member carried by the other of said input or output members; said energizable electromagnet being positioned with respect to said magnetic member to drive said magnetic member into engagement with said friction member to hold said members in engagement with a relatively low, closely controlled torque.

8. A controller; said controller comprising a pressure measuring mechanism for converting pressure change into an output mechanical motion, a transducer means for converting mechanical motion into an electrical signal and an electromagnetic clutch; said electromagnetic clutch having an input member and an output member; said input member and output member being continuously connected to one another through a magnetically responsive clutch medium and an energizable winding for generating a magnetic field through said clutching medium and a stop means for limiting the motion of said output member; said clutching medium being constructed to transmit only a relatively small torque of a predetermined controlled value and to thereafter slip; said input member of said clutch being operatively connected to said pressure measuring mechanism to have said output mechanical motion of said pressure measuring mechanism applied thereto; said output member of said clutch being operatively connected to said transducer means and supplying mechanical motion thereto to be converted to an electrical signal; said transducer generating an electrical signal responsive to pressure change measured by said pressure measuring mechanism; a pressure change beyond some predetermined value causing the application of a torque beyond said predetermined torque capacity of said clutch to be reached whereby said input shaft of said clutch continues to rotate independently of said output shaft and said transducer; the initial position of said first shaft setting a reference point from which output signals of said transducer are measured; said rotation of said first shaft independently of said output shaft adjusting said reference point to a new value; said clutch medium including an energizable electromagnet, a friction member carried by one of said input or output members and a magnetic member carried by the other of said input or output member; said energizable electromagnet being positioned with respect to said magnetic member to drive said magnetic member into engagement with said friction member to hold said members in engagement with a relatively low, closely controlled torque.

9. A controller; said controller comprising a pressure measuring mechanism for converting pressure change into an output mechanical motion, a transducer means for converting mechanical motion into an electrical signal and an electromagnetic clutch; said electromagnetic clutch having an input member and an output member; said input member and output member being continuously connected to one another through a magnetically responsive clutch medium and an energizable winding for generating a magnetic field through said clutching medium and a stop means for limiting the motion of said output member; said clutching medium being constructed to transmit only a relatively small torque of a predetermined controlled value and to thereafter slip; said input member of said clutch being operatively connected to said pressure measuring mechanism to have said output mechanical motion of said pressure measuring mechanism applied thereto; said output member of said clutch being operatively connected to said transducer means and supplying mechanical motion thereto to be converted to an electrical signal; said transducer generating an electrical signal responsive to pressure change measured by said pressure measuring mechanism; a pressure change beyond some predetermined value causing the application of a torque beyond said predetermined torque capacity of said clutch to be reached whereby said input shaft of said clutch continues to rotate independently of said output shaft and said transducer; said transducer means comprising an E–I pick-off means, the I member of said E–I pick-off means being operatively connected to said output shaft and being movable with respect to the E member of said E–I pick-off means responsive to movement of said output shaft; said stop means being positioned to limit the motion of said I member to some predetermined range; said clutch medium including an energizable electromagnet, a friction member carried by one of said input or output members and a magnetic member carried by the other of said input or output member; said energizable electromagnet being positioned with respect to said magnetic member to drive said magnetic member into engagement with said friction member to hold said members in engagement with a relaitvely low, closely controlled torque.

10. In an altitude controller; a pressure measuring means for converting a pressure change due to altitude change into a mechanical motion and a shaft relatively fixed with respect to said pressure measuring means and operatively connected to said pressure measuring means to be rotated thereby responsive to altitude change; an electromagnetic clutch, an electrical pick-off and a stop mechanism; said electrical pick-off being constructed to generate electrical signals responsive to an input motion; said stop means being associated with said electrical pick-off to limit the range of motion thereof; said shaft being connected to the input of said clutch, said electrical pick-off being connected to the output of said electromagnetic clutch; said electromagnetic clutch being characterized in being capable of transmission of only a relatively low, accurately controlled torque before slippage thereof after motion of said electrical pick-off is limited by said stop means.

11. A controller; said controller comprising a pressure measuring mechanism for converting pressure change into an output mechanical motion, a transducer means for converting mechanical motion into an electrical signal and an electromagnetic clutch; said electromagnetic clutch having an input member and an output member; said input member and output member being continuously connected to one another through a magnetically responsive clutching medium and an energizable winding for generating a magnetic field through said clutching medium and a stop means for limiting the motion of said output member; said clutching medium being constructed to transmit only a relatively small torque of a predetermined controlled value and to thereafter slip; said input member of said clutch being operatively connected to said pressure measuring mechanism to have said output mechanical motion of said pressure measuring mechanism applied thereto; said output member of said clutch being operatively connected to said transducer means and supplying mechanical motion thereto to be converted to an electrical signal; said transducer generating an electrical signal responsive to pressure change measured by said pressure measuring mechanism; a pressure change beyond some predetermined value causing the application of a torque beyond said predetermined torque capacity of said clutch to be reached whereby said input shaft of said clutch continues to rotate independently of said output shaft and said transducer; and biasing means operatively connected to said output shaft for normally retaining said output shaft in a position corresponding to a minimum electrical signal position for said transducer means.

12. A controller; said controller comprising a pressure measuring mechanism for converting pressure change into an output mechanical motion, a transducer means for converting mechanical motion into an electrical signal and an electromagnetic clutch; said electromagnetic clutch having an input member and an output member; said input member and output member being continuously connected to one another through a magentically responsive clutching medium and an energizable winding for generating a magnetic field through said clutching medium and a stop means for limiting the motion of said output member; said clutching medium being constructed to transmit only a relatively small torque of a predetermined controlled value and to thereafter slip; said input member of said clutch being operatively connected to said pressure measuring mechanism to have said output mechanical motion of said pressure measuring mechanism applied thereto; said output member of said clutch being operatively connected to said transducer means and supplying mechanical motion thereto to be converted to an electrical signal; said transducer generating an electrical signal responsive to pressure change measured by said pressure measuring mechanism; a pressure change beyond some predetermined value causing the application of a torque beyond said predetermined torque capacity of said clutch to be reached whereby said input shaft of said clutch continues to rotate independently of said output shaft and said transducer; the initial position of said first shaft setting a reference point from which output signals of said transducer are measured; said rotation of said first shaft independently of said output shaft adjusting said reference point to a new value; said transducer means comprising an E–I pick-off means, the I member of said E–I pick-off means being operatively connected to said output shaft and being movable with respect to the E member of said E–I pick-off means responsive to movement of said output shaft; said stop means being positioned to limit the motion of said I member to some predetermined range; said energizable winding of said electromagnetic clutch being connected in circuit arrangement with the electrical input of said E–I pick-off to be simultaneously energized with said electrical input of said E–I pick-off.

References Cited in the file of this patent

UNITED STATES PATENTS

| | | |
|---|---|---|
| 2,446,546 | Meston | Aug. 10, 1948 |
| 2,689,951 | Argentieri et al. | Sept. 21, 1954 |
| 2,729,780 | Miller et al. | Jan. 3, 1956 |